United States Patent [19]
Daidone

[11] Patent Number: 6,105,560
[45] Date of Patent: Aug. 22, 2000

[54] BAFFLED BREATHER TUBE

[76] Inventor: Phil Daidone, 27205 Pine Ave., Canyon Country, Calif. 91351

[21] Appl. No.: 09/327,916

[22] Filed: Jun. 8, 1999

[51] Int. Cl.⁷ .................................................. F02M 25/00
[52] U.S. Cl. ............................................................ 123/572
[58] Field of Search .................................... 123/572, 573, 123/574, 41.86

[56] References Cited

U.S. PATENT DOCUMENTS

| | | | |
|---|---|---|---|
| 4,453,525 | 6/1984 | Debruler | 123/572 |
| 4,597,372 | 7/1986 | Furukawa | 123/572 |
| 4,607,604 | 8/1986 | Kanoh et al. | |
| 4,779,601 | 10/1988 | Dallman | |
| 4,958,613 | 9/1990 | Hiraoka et al. | 123/572 |
| 5,069,192 | 12/1991 | Matsumoto et al. | 123/572 |
| 5,205,243 | 4/1993 | Buchholz | |
| 5,551,409 | 9/1996 | Sanders | |
| 5,617,834 | 4/1997 | Lohr | |
| 5,647,337 | 7/1997 | Johnson et al. | |
| 5,664,549 | 9/1997 | Hutchins | |

*Primary Examiner*—Marguerite McMahon

[57] ABSTRACT

A novel breather tube device for interconnection with a block mounted valve cover. The device includes a tubular member having an upwardly extending tubular segment having a threaded portion and a gasket engaging flange. A gasket is received over the upwardly extending tubular segment for sealably engagement with flange and with the lower surface of the valve cover. A threaded cinch ring is adapted to be threadably connected to the threaded portion of the upwardly extending tubular segment in a manner such that it can be threaded down into pressural engagement with the upper surface of the top wall of the valve cover so that the gasket will be compressed between the lower surface of the valve cover and the gasket engaging flange. An important aspect of one form of the invention resides in the provision of a downwardly extending tubular segment that is connected to the flange. This tubular segment extends downwardly into the interior of the valve cover and effectively prevents oil from splashing into the tubular segment of the device and into a breather cap.

10 Claims, 3 Drawing Sheets

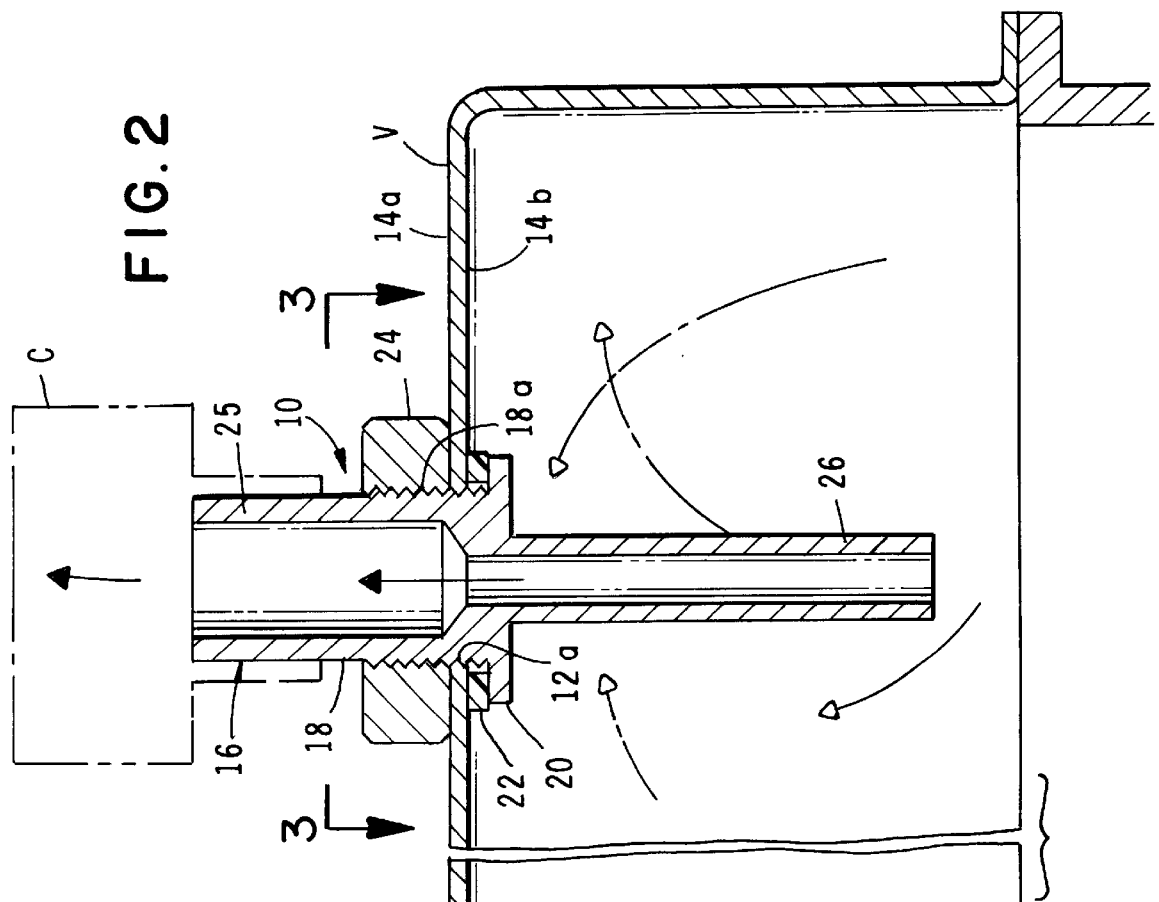
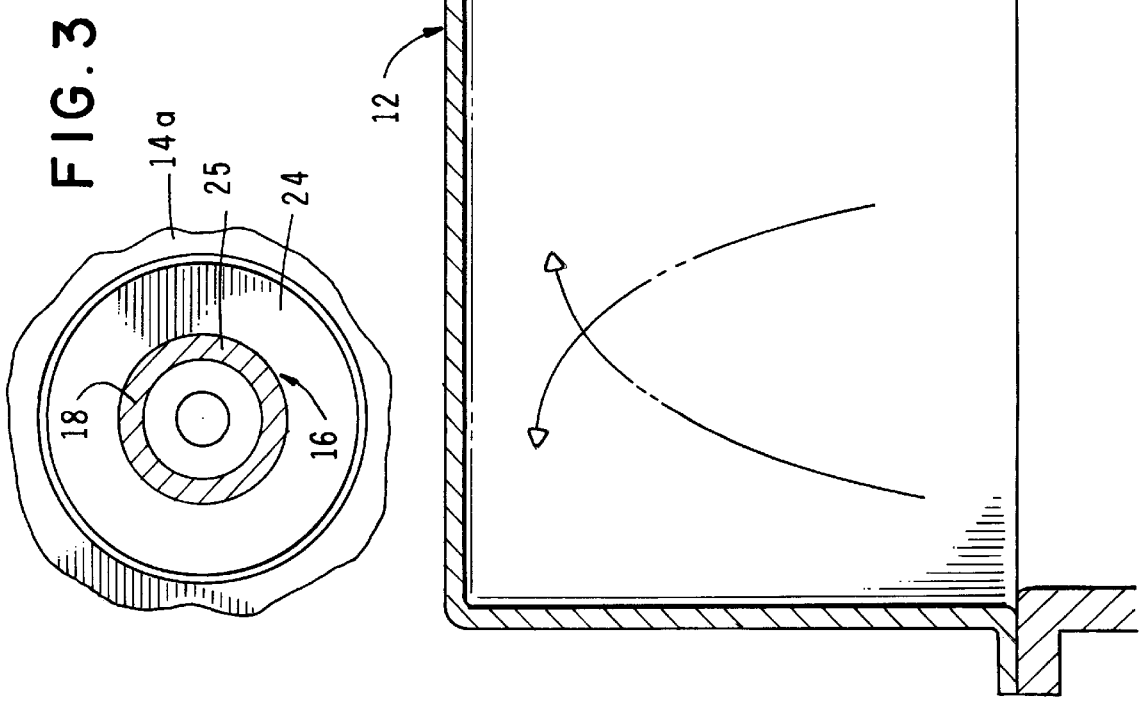

BAFFLED BREATHER TUBE

BACKGROUND OF THE INVENTION

1. Field of the Invention

The present invention relates generally to breather devices for internal combustion engines. More particularly, the invention concerns a novel baffled breather tube assembly that can quickly and easily be connected to a valve cover of an internal combustion engine.

2. Discussion of the Prior Art

Automobile enthusiasts frequently replace stock, block-mounted valve covers with polished aluminum or chrome-plated replacement valve covers. These valve covers are usually provided with an opening adapted to receive a breather tube over which a polished aluminum or chrome-plated breather cap can be telescopically received. In the prior art, the breather tube is sometimes welded to the valve cover or is affixed thereto by fasteners such as metal screws or the like. In this latter case, the valve cover must be drilled to accept the fasteners which extend through openings provided in a base plate that is affixed to the base of the breather tube. These prior art approaches are time consuming and generally expensive. On occasion, push-in type breather tubes are also used and are sealed to the valve cover by elastomeric grommets or similar sealing means. However, the push-in type breather tube is not permitted in states such as California.

Another drawback of many prior art breather tube assemblies is that no means are provided to prevent engine oil from undesirably splashing into the interior of the breather tube through the bottom opening thereof. Additionally, unless the prior art breather tubes are properly affixed to the valve cover undesirable oil leaks around the breather tube can occur.

The drawbacks of the prior art breather tube constructions are uniquely overcome by the baffled breather tube device of the present invention that comprises a downwardly extending baffle tube and includes novel means for sealably interconnecting the device with the replacement valve cover.

SUMMARY OF THE INVENTION

By way of summary, the present invention concerns a novel breather tube device for interconnection with a block mounted valve cover. The device includes a tubular member having an upwardly extending tubular segment having a threaded portion and a gasket engaging flange. A gasket is received over the upwardly extending tubular segment for sealable engagement with the flange and with the lower surface of the valve cover. A threaded cinch ring is adapted to be threadably connected to the threaded portion of the upwardly extending tubular segment in a manner such that it can be threaded down into pressural engagement with the upper surface of the top wall of the valve cover so that the gasket will be compressed between the lower surface of the valve cover and the gasket engaging flange. An important aspect of one form of the invention resides in the provision of a downwardly extending tubular segment that is connected to the flange. This tubular segment extends downwardly into the interior of the valve cover and effectively prevents oil from splashing into the tubular segment of the device and into a breather cap which can be interconnected with the upwardly extending tubular segment. The cinch ring is provided with a knurled outer surface to enable it to be conveniently threaded down into engagement with the top wall of the valve cover.

With the foregoing in mind it is an object of the present invention to provide a breather tube device that can be quickly and easily interconnected with a conventional block mounted valve cover. More particularly, it is an object of the invention to provide a breather tube device of the aforementioned character which can be sealably interconnected with the valve cover so as to effectively prevent leakage of oil between breather tube device and the valve cover.

Another object of the invention is to provide a breather tube device of the type described in the preceding paragraph which includes a downwardly extending tubular segment that effectively functions to prevent oil from splashing into the upper portions of the breather tube and into the breather cap that is affixed thereto.

Another object of the invention is to provide a breather tube device of the class described in which the upwardly extending tubular segment thereof can be conveniently telescopically inserted into the stem of a conventional, commercially available breather cap, or alternatively can be interconnected with a conventional positive crank case ventilation (PVC) valve.

Another object of the invention is to provide a breather tube device of the character described in the preceding paragraphs which is of simple construction, can be quickly installed without the use of special tools and without modifying the conventional valve cover.

Another object of the invention is to provide a breather tube device that can be used in conjunction with valve covers of the character used to cover the overhead cams of an overhead cam engine.

BRIEF DESCRIPTION OF THE DRAWINGS

FIG. 2 is an enlarged, side-elevational, cross-sectional view of the baffled breather tube assembly shown interconnected with a conventional valve over.

FIG. 3 is a cross-sectional view taken along lines 3—3 of FIG. 2.

DESCRIPTION OF THE INVENTION

Figures 1, 5:
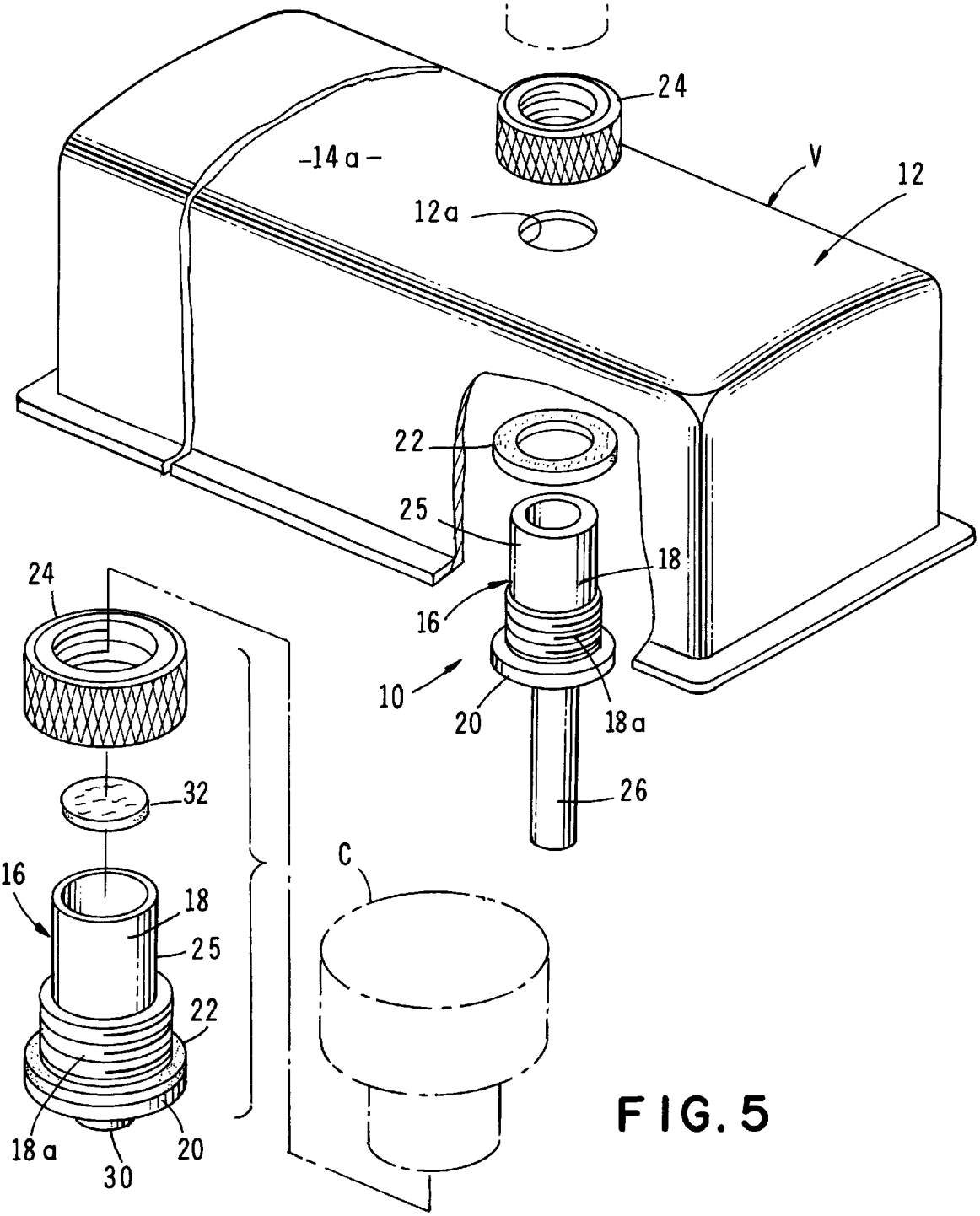
FIG. 1 is a generally perspective, exploded view of one form of the baffled breather tube assembly of the invention which is used in connection with block-mounted valve covers.
FIG. 5 is a generally perspective, exploded view of the alternate form of the assembly shown in FIG. 4.

Referring to the drawings and particularly to FIGS. 1 through 3, one form of the breather tube device of the present invention is there illustrated and generally designated by the numeral 10. In the form of the invention there shown the breather tube device is usable with a block mounted valve cover "V" having a top wall 12 and a tube receiving aperture 12a formed therein. As best seen by referring to FIG. 2, the top wall of the valve cover includes an upper surface 14a and a lower surface 14b. In the present form of the invention the breather tube device comprises a tubular member 16 having an upwardly extending tubular segment 18 and gasket engaging flange 20. Upwardly extending tubular segment 18 is provided with a threaded portion 18a disposed adjacent the gasket engaging flange 20. Receivable over tubular segment 18 is compressible gasket 22. Gasket 22 can be constructed from various materials including rubber and elastomers. When the device of the invention is in position within the aperture 12 formed in the valve cover, the upper surface of gasket 22 engages the lower surface 14b of the top wall of the valve cover and the lower surface of the gasket engages the gasket engaging flange 20.

To sealably compress gasket 22 between flange 20 and the lower surface 14b of top wall 12, an internally threaded cinch ring 24 is threadably connected to threaded portion 18a of upwardly extending tubular segment 16. Cinch ring 24 includes a knurled outer surface and is adapted to be threaded down into pressural engagement with the upper surface 14a of top of top wall 12 of the valve cover "V" so as to controllably compress gasket 22 between the lower surface of the top wall of the cover and the gasket engaging flange 20.

In the embodiment of the invention shown in FIGS. 1 through 3, upwardly extending tubular segment 18 includes a generally cylindrical portion 25. Cylindrical portion 25 is of a size that can be conveniently telescopically inserted into the stem portion of a conventional breather cap "C" (FIG. 2). Alternatively, cylindrical portion 25 can be used to interconnect a positive crankcase ventilation valve (PVC) to the breather tube. In the form of the invention shown in FIGS. 1 through 3 the breather tube device also includes a downwardly extending tubular segment 26 which is connected to flange 20. While tubular segment 26 can be of various lengths, a length of approximately 1½ to 2½ inches has proven satisfactory for most applications.

As indicated in FIG. 2 tubular segment 26 extends downwardly within the valve cover and functions to prevent oil from splashing into upwardly extending tubular segment 18. With this unique construction, when a conventional breather cap "C" of the character shown by the phantom lines in FIG. 2 is telescopically positioned over portion 25 of segment 18, the valve cover will be permitted to "breathe" without oil undesirably splashing into the interior of segment 18 and into breather cap "C". Breather cap "C" is of a character well known in the art and is readily commercially available. When the valve cover "V" is constructed of polished aluminum or is chrome plated, breather cap "C" is preferably of matching construction and is made of polished aluminum, or is chrome plated. The breather tube of the invention is preferably constructed from aluminum. However other materials such as aluminum can also be used to construct the breather tube.

Figure 4:
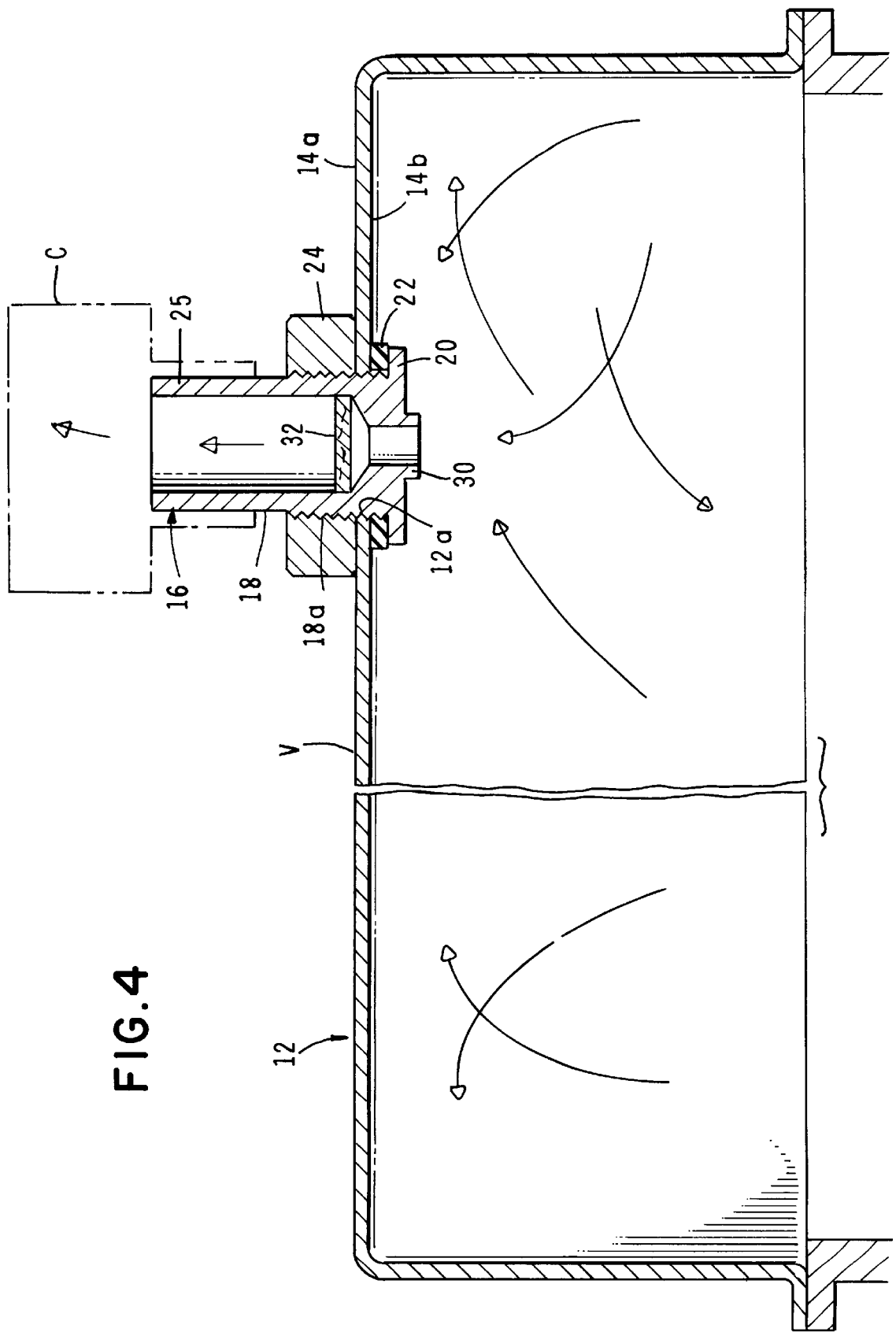
FIG. 4 is an enlarged, cross-sectional view similar to FIG. 2 but showing an alternate form of the baffled breather tube assembly of the invention.

Turning next to FIGS. 4 through 5, an alternate form of the breather tube device of the present invention is there shown. This breather tube device is of similar construction to that shown in FIGS. 1 through 3 and like numerals are used in FIGS. 4 and 5 to identify like components. The major difference between the device shown in figures numeral 1 through 3 and that shown in FIGS. 4 and 5 resides in the fact that the downwardly extending tubular segment 30 is substantially shortened. The device of this latter form of the invention is designed to be used with block mounted valve covers of the character used to cover engines of the type having overhead cams wherein an elongated, downwardly extending tubular segment, such as segment 26 would interfere with the operation of the overhead cams.

When this alternate form of breather the device is used, a porous, disk-like filter member 32 is provided within tubular segment 18 in the and in the manner shown in FIG. 4. Member 32 can be constructed from various porous materials such as felt, sponge rubber, or various compost materials and functions to prevent oil from the interior of the valve cover splashing into segment 18 and into breather cap "C".

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A breather tube device for interconnection with a valve cover having a top wall with a tube receiving aperture formed therein, said top wall having an upper surface and a lower surface, said breather tube device comprising:

(a) a tubular member having an upwardly extending tubular segment, having a threaded portion and a gasket engaging flange;

(b) a gasket received over said upwardly extending tubular segment for sealable engagement with said flange and with the lower surface of the top wall of the valve cover; and (c) a threaded cinch ring threadably connected to said threaded portion of said upwardly extending tubular segment for pressural engagement with the upper surface of the top wall of the valve cover, whereby said gasket will be compressed between the lower surface of the top wall of the valve cover and said gasket engaging flange.

2. The device as defined in claim 1 in which said upwardly extending tubular segment includes a reduced diameter portion disposed proximate said threaded portion.

3. The device as defined in claim 1 further including a downwardly extending tubular segment connected to said flange.

4. The device as defined in claim 2 in which said downwardly extending tubular segment has a length of approximately 2½ inches.

5. The device as defined in claim 2 in which said threaded cinch ring is internally threaded and includes a knurled external surface.

6. A breather tube device for interconnection with a valve cover having a top wall with a tube receiving aperture formed therein, said top wall having an upper surface and a lower surface, said breather tube device comprising:

(a) a tubular member including:
      (i) a downwardly extending tubular segment;
      (ii) an upwardly extending, enlarged diameter tubular segment having a threaded portion; and
      (iii) a gasket engaging flange disposed between said downwardly extending tubular segment and said upwardly extending tubular segment;

(b) a gasket received over said upwardly extending tubular segment for sealable engagement with said flange and with the lower surface of the top wall of the valve cover; and (c) a threaded cinch ring threadably connected to said threaded portion of said upwardly extending tubular segment for pressural engagement with the upper surface of the top wall of the valve cover, whereby said gasket will be compressed between the lower surface of the top wall of the valve cover and said gasket engaging flange.

7. The device as defined in claim 6 in which said downwardly extending tubular segment length of approximately 2½ inches.

8. The device as defined in claim 6 in which said downwardly extending tubular segment has a length no greater than ½ inch.

9. The device as defined in claim 6 in which said upwardly extending tubular segment has a diameter portion located proximate said threaded portion.

10. The device as defined in claim 6 in which said threaded cinch ring is internally threaded and includes a knurled external surface.

* * * * *